April 23, 1940.  H. N. WADE  2,198,142
EXTRACTION OF GASOLINE FROM NATURAL GAS
Filed Jan. 4, 1938
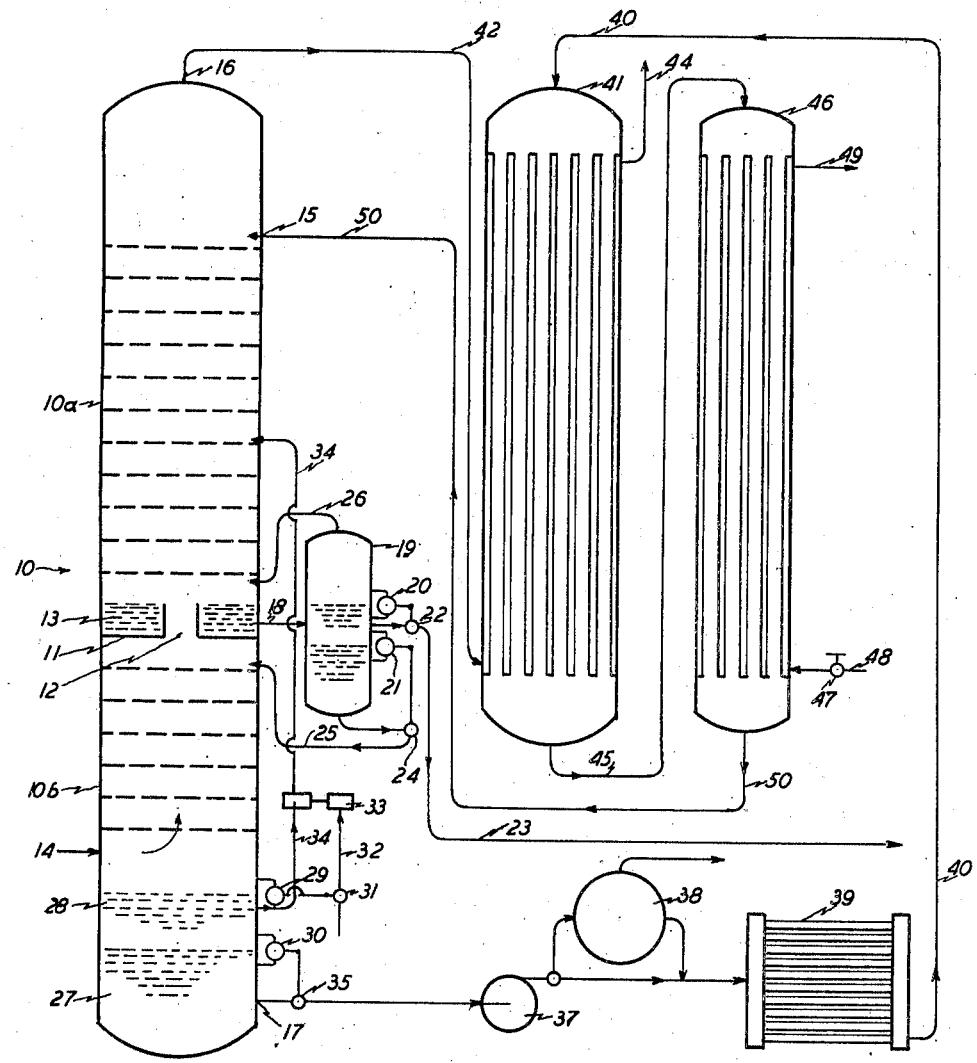
HENRY N. WADE
INVENTOR
*Paul W. [signature]*
ATTORNEY Patented Apr. 23, 1940

2,198,142

UNITED STATES PATENT OFFICE 2,198,142

EXTRACTION OF GASOLINE FROM NATURAL GAS

Henry N. Wade, Los Angeles, Calif., assignor to Parkhill-Wade, Los Angeles, Calif., a copartnership Application January 4, 1938, Serial No. 183,324

5 Claims. (Cl. 62—175.5)

The object of the invention is to separate and recover the gasoline content of wet natural gas by cooling, with or without compression, without the use of absorbent oil, with less refrigeration and in less costly apparatus than has heretofore been possible.

The invention involves as principal steps the cooling of the gas by direct contact in counterflow with a strongly cooled brine, by which the constituents liquefiable at the obtaining temperature and pressure are condensed; the removal of the condensate from a relatively cool portion of the contacting tower; a further contact between the still relatively cool brine and the entering gas by which the brine is raised to the initial gas temperature and its entire refrigerative value recovered; the removal from the brine of any water which it may have absorbed from the gas; a heat interchange between the warm brine and the cold dry gas by which the brine is brought down to a relatively low temperature and the discharged gas to approximately atmospheric temperature, and the final chilling of the brine by an evaporating liquid refrigerant by which the brine is reduced to the temperature at which it is desired to introduce it into the contacting tower, this final refrigeration compensating heat of condensation of water and of gasoline and heat leakages into the colder portions of the apparatus.

The invention may best be understood with reference to the attached drawing, showing in a strictly diagrammatic manner and without limitation to specific elements of apparatus an illustrative manner of putting the invention into practice.

Referring to the drawing, 10 is any counterflow gas-to-liquid contacting tower, which may be provided with perforated plates, bubbling plates or other approved means for producing intimate contact between gas and liquid. This tower is divided into two sections, an upper or condensing section 10a and a lower or precooling section 10b, by a partition plate 11 having a throat 12 for the upward passage of gas and forming a pocket 13 in which liquid collects and from which it can be drained. If preferred, separate towers suitably connected by pipes may be used instead of the divided tower illustrated.

Wet natural gas, or other gas from which it may be desired to remove condensible constituents, is introduced into the tower as at 14, beneath the lowermost plate of the lower section 10b. Cold brine, as for example calcium chloride brine, enters the tower as at 15, above the uppermost plate of upper section 10a. In counterflowing throughout the total length of the tower a complete interchange of heat takes place and the cold gas leaves the tower as at 16 at substantially the temperature of the entering brine, while the brine stream finally leaves the tower as at 17, at substantially the temperature of the entering gas.

The profound cooling of the gas in the upper section 10a produces condensation of liquefiable constituents, the amount of condensation being controlled by varying the temperature and pressure conditions as may be required. The condensate, being insoluble in the brine, flows downwardly with it in the form of films or layers floating on the heavier brine, the mixed liquids being collected in pocket 13. From this pocket the liquids flow through a pipe into a separating vessel 19 from which they are separately withdrawn. This vessel is provided with two float-actuated controls 20 and 21, the upper of which is weighted to float on the upper layer of gasoline separating in the vessel and operates a valve 22 in a pipe 23 through which the total product gasoline is conveyed to a stabilizing plant or other point of disposition of the gasoline. The lower float is so weighted as to maintain a position between the gasoline layer and the much heavier brine beneath it and operates a valve 24 in a pipe 25 through which the brine separating in the vessel is returned onto the topmost plate of the lower section 10b. Finally, an equalizing pipe 26 connects the upper end of vessel 19 with the lower portion of the upper tower section 10a.

The return of the only partially warmed brine into the upper end of the lower tower section and its passage downwardly over the plates in this section produces the initial cooling of the upwardly passing gas stream and a substantial equalization of temperature between the brine and the entering gas. The brine, having expended all of its refrigerating effect, collects in the extreme lower end of the tower 10, as in the layer indicated at 27, and in many cases a small amount of relatively heavy condensate will be produced in the lower section 10a and will form a layer 28 above the brine. It is therefore desirable to provide this portion of the tower with two float actuated controls 29 and 30, the upper being weighted to float on the oily condensate layer and to control a valve 31 in the steam pipe 32 supplying a pump 33, this pump discharging the condensate as it accumulates, through a pipe 34 into the upper portion of the tower or into the gasoline stream discharged from separator 19 as may be preferred. The lower float is weighted to float on the surface of the brine layer 27 and actuates a valve 35 in a pipe 36 through which the spent brine passes to a circulating pump 37.

In its contact at reduced temperatures with a gas which is usually water-saturated at normal temperature, the brine absorbs water from the gas and reduces it to a high degree of desiccation (a low dew-point) while itself becoming diluted. As the freezing point of the brine changes as its concentration is decreased, the brine stream discharged by pump 37 must be passed, as a whole or in part, through an evaporating unit 38 in which a quantity of water equal to that withdrawn by the brine from the gas is continuously removed. This evaporating unit is no part of the present invention and its construction in one form or another is well known. In any case the brine stream, after evaporation of excess water, is above atmospheric temperature and is passed to an air-cooled or water-cooled unit 39 in which its temperature is lowered to substantially atmospheric.

The warm brine now passes through a pipe 40 to a heat interchanger 41 in which it is brought into indirect heat exchange relation with the stream of cold dry gas flowing from the upper end of the tower through pipe 42. The drawing shows a conventional tubular interchanger but any desired form of interchanger may be used provided it does not permit contact between the gas and the brine. It is emphatically not equivalent to permit such contact as in so doing the desiccation of the gas and the low dew-point essential in its transmission through long pipe lines would be lost. In this interchanger the gas stream is brought back to substantially atmospheric temperature and is discharged through pipe 44 into the carrying line or to other point of disposition of dry gas, that is, gas which is dry both as regards water and as regards useful gasoline content.

The brine stream leaving the interchanger through pipe 45 has been materially cooled by giving up heat to the cold gas stream but is still at a temperature above that at which it must be admitted to the contacting tower, as it carries, in a subatmospheric temperature range, a quantity of heat equal to that liberated in condensing water and gasoline plus heat leakage into the apparatus, which should be carefully insulated to maintain this leakage within the lowest possible limits. The stream is therefore conducted through pipe 45 into a chiller 46 which is supplied with liquid anhydrous ammonia or other gaseous refrigerant through an expansion valve 47 interposed in a pipe 48 connecting with any gas liquefaction plant not shown. The gasified refrigerant is returned to the liquefaction system through pipe 49. The brine stream, in this manner returned to its initial temperature, is conveyed through pipe 50 to the top of the upper tower section 10a which it enters at 15 as above described, thus completing the cycle.

The system above described may be utilized at pressures even as low as atmospheric (that is, at an inlet pressure only sufficient to impel the gas stream through the unit) in cases where the gas is rich in liquids and a complete stripping is not required. Ordinarily it will be operated at some superatmospheric pressure which, in view of the composition of the available gas supply, offers the least costly composite of compression and refrigeration costs, increased refrigeration offsetting decreased operating pressure within limits. The process, however, is particularly applicable to large scale installations in which natural gases containing small amounts of gasoline are brought in any case to a high pressure, of the order of several hundred pounds gauge, for delivery into long distance transmission lines. In such cases the separation of the gasoline and the simultaneous reduction of the dew-point of the stripped gas are accomplished at a very small combined cost and in apparatus of great simplicity.

It is also a material advantage of the method described that the lightest gasoline condensing in the upper end of the upper tower section is subjected to a very considerable degree of fractionation in its downward travel from plate to plate and under favorable circumstances may be withdrawn in a partially stabilized condition, affording a material reduction in the duty on the stabilization step.

I claim as my invention:

1. The method of extracting gasoline from wet natural gas which comprises: cooling a stream of said gas to the temperature of liquefaction of constituents thereof in a zone of direct counterflow contact with a stream consisting solely of cold brine; separating and withdrawing from a medial portion of said zone gasoline liquefied therein; withdrawing the residual gas from the upper portion of said zone at approximately the entering temperature of said brine stream; withdrawing the spent brine from the lower portion of said zone at approximately the entering temperature of said gas stream; passing the withdrawn brine stream in indirect heat interchange relation with said withdrawn gas stream and thereby cooling said brine stream and warming said gas stream, and further cooling said brine stream to provide first said stream of cold brine.

2. A method of extracting gasoline from a stream of natural gas including the steps of cooling the gas stream to the temperature of liquefaction of constituents thereof by direct counterflow contact with a stream consisting solely of refrigerated brine; separating said liquefied constituents from the partially cooled gas stream, and bringing the fully cooled gas stream into indirect heat interchange relation with the brine stream which has expended its cooling effect in said gas cooling step.

3. The method of extracting gasoline from wet natural gas which comprises: establishing a zone of gas to liquid contact and passing a stream of said gas upwardly through said zone; supplying to the upper end of said zone a stream consisting solely of refrigerated brine; cooling said gas by contact with said brine in the upper portion of said zone to the temperature of liquefaction of constituents of said gas; withdrawing said gas stream from the upper end of said zone at substantially the entering temperature of said brine stream; withdrawing from the system said liquefied constituents at a medial point in said zone; further contacting said brine stream with said gas stream in the lower portion of said zone and thereby bringing said brine stream to substantially the entering temperature of said gas stream while imparting a preliminary cooling to said gas stream; withdrawing said brine stream and evaporating therefrom water absorbed in said contacting zone; bringing said brine stream to substantially atmospheric temperature; passing said brine stream in indirect heat interchange relation with said withdrawn gas stream, whereby said brine stream is cooled and said gas stream is warmed, and refrigerating said cooled brine stream to supply said stream of refrigerated brine.

4. The method of extracting gasoline from wet natural gas which comprises: supplying to a contacting zone a stream of said gas and a stream of brine refrigerated to a temperature materially below the temperature of said gas; effecting heat interchange in said zone and thereby liquefying gasoline from said gas; withdrawing said gasoline from said zone at a temperature intermediate the entering temperatures of said gas stream and said brine stream; withdrawing said gas from said zone at substantially the entering temperature of said brine stream, and withdrawing said brine from said zone at substantially the entering temperature of said gas stream.

5. The method of extracting gasoline from wet natural gas which comprises: supplying to a contacting zone a stream of said gas and a stream of brine refrigerated to a temperature materially below the temperature of said gas; effecting heat interchange in said zone and thereby liquefying gasoline from said gas; withdrawing said gasoline from said zone at a temperature intermediate the entering temperatures of said gas stream and said brine stream; withdrawing said gas from said zone at a temperature materially below that at which said gasoline is withdrawn, and withdrawing said brine from said zone at a temperature materially higher than that at which said gasoline is withdrawn.

HENRY N. WADE.